United States Patent
Gartner et al.

(10) Patent No.: US 8,767,935 B2
(45) Date of Patent: Jul. 1, 2014

(54) TELECONFERENCE MONITORING AND ALERTING METHOD

(75) Inventors: Jeffrey G. Gartner, Hopewell Junction, NY (US); Colm Smyth, Foxrock (IE)

(73) Assignee: Avaya Inc., Basking Ridge, NJ (US)

( * ) Notice: Subject to any disclaimer, the term of this patent is extended or adjusted under 35 U.S.C. 154(b) by 1051 days.

(21) Appl. No.: 12/540,202

(22) Filed: Aug. 12, 2009

(65) Prior Publication Data

US 2011/0038472 A1 Feb. 17, 2011

(51) Int. Cl.
*H04M 3/42* (2006.01)

(52) U.S. Cl.
USPC ........................... 379/202.01; 379/158

(58) Field of Classification Search
USPC ............. 379/202.01, 201.01, 203.01, 204.01, 379/158
See application file for complete search history.

(56) References Cited

U.S. PATENT DOCUMENTS

| | | | |
|---|---|---|---|
| 5,710,591 A * | 1/1998 | Bruno et al. | 348/14.09 |
| 7,162,691 B1 * | 1/2007 | Chatterjee et al. | 715/205 |
| 7,191,129 B2 * | 3/2007 | Brown et al. | 704/235 |
| 7,466,334 B1 * | 12/2008 | Baba | 348/14.06 |
| 8,019,069 B1 * | 9/2011 | Cyriac et al. | 379/202.01 |
| 8,296,647 B1 * | 10/2012 | Bourdev | 715/230 |
| 2002/0004734 A1 * | 1/2002 | Nishizawa | 705/9 |
| 2003/0235279 A1 * | 12/2003 | Richomme | 379/88.15 |
| 2004/0090466 A1 * | 5/2004 | Loveria, III | 345/781 |
| 2004/0194035 A1 * | 9/2004 | Chakraborty | 715/531 |
| 2004/0236830 A1 * | 11/2004 | Nelson et al. | 709/204 |
| 2005/0050061 A1 * | 3/2005 | Karstens | 707/100 |
| 2005/0180341 A1 * | 8/2005 | Nelson et al. | 370/260 |
| 2006/0224430 A1 * | 10/2006 | Butt | 705/8 |
| 2007/0271502 A1 * | 11/2007 | Bedi et al. | 715/512 |
| 2010/0158232 A1 * | 6/2010 | Sylvain | 379/202.01 |
| 2010/0161631 A1 * | 6/2010 | Yu et al. | 707/758 |
| 2011/0154192 A1 * | 6/2011 | Yang et al. | 715/256 |
| 2011/0163971 A1 * | 7/2011 | Wagner et al. | 345/173 |
| 2012/0179714 A1 * | 7/2012 | Chandhok et al. | 707/769 |

* cited by examiner

*Primary Examiner* — William Deane, Jr.
(74) *Attorney, Agent, or Firm* — Maldjian Law Group LLC; John Maldjian; Alexander D. Walter

(57) ABSTRACT

A method is disclosed which allows an invitee to a conference call, who is not present on at least part of the call, to have the call monitored in his or her absence. The invitee is offered the opportunity to review, ahead of the call, one or more electronic documents that are pertinent to the call. The invitee can specify one or more pointers for the purpose of identifying positions that correspond to portions of the document that are relevant to the invitee. When a relevant portion of an electronic document has been reached or is soon to be reached during the call, a message is transmitted to the absent invitee. Additionally, the invitee can annotate slides or portions of an electronic document with comments that he or she wants addressed during the conference call. A message is subsequently transmitted to the invitee, providing responses to the comments left earlier.

20 Claims, 7 Drawing Sheets

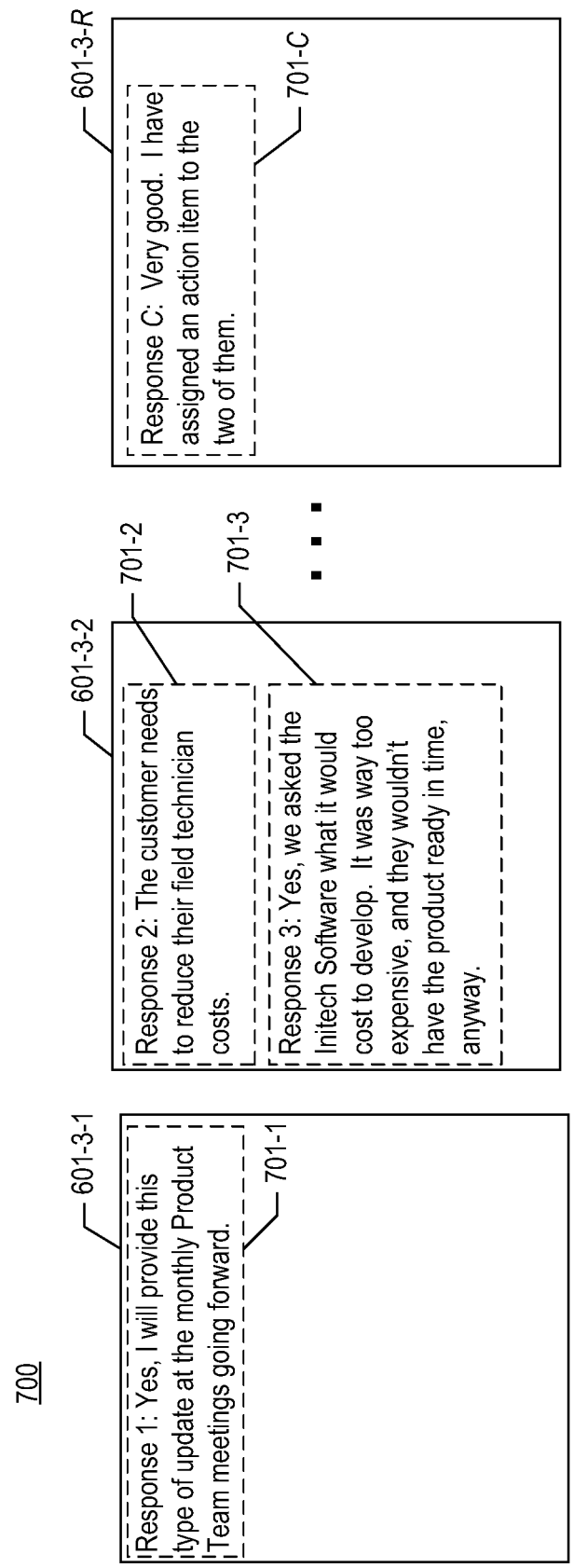

TELECONFERENCE MONITORING AND ALERTING METHOD

FIELD OF THE INVENTION

The present invention relates to telecommunications in general, and, more particularly, to teleconferencing.

BACKGROUND OF THE INVENTION

A teleconference is a meeting between two or more participants who are not at the same place at the same time. Teleconferencing is a low-cost alternative to getting large groups of invitees in a single place at the same time for the purpose of having a meeting. The best known example of a teleconference is a conference call with more than two people participating in the call. These teleconferences can have upwards of several hundred people and can last for several hours. An alternative to having a teleconference would be to get these people to the same place at the same time, which is often prohibitive.

Even when participants to a conference call are calling in from the places of their choosing, often only a portion of a teleconference is useful to a participant. Because teleconferences can last for hours at a time, it is wasteful for a participant to wait for the small portion of the teleconference that is useful to her. Furthermore, invitees to teleconferences sometimes cannot attend due to conflicts or other reasons.

Therefore, what is needed is a teleconferencing system that enables people to optimize their time with respect to a teleconference to which they have been invited, without some of the disadvantages in the prior art.

SUMMARY OF THE INVENTION

The present invention allows an invitee to a conference call, who is not present on at least part of the call, to have the call monitored in his or her absence. In accordance with the illustrative embodiment of the present invention, the invitee is offered the opportunity to review, ahead of or during the call, one or more electronic documents that are pertinent to the call. In reviewing each document, the invitee can specify one or more pointers for the purpose of identifying positions throughout the content of the document. The pointer-identified positions correspond to portions of the document, as well as possibly to events to occur during the call, which are relevant to the invitee.

During the call, when a relevant portion of an electronic document, as identified by a pointer, has been reached or is soon to be reached, the system of the illustrative embodiment transmits a message to the invitee who is not on the call. The message might provide: i) information that is presented about the relevant portion such as a response to a question specified by the invitee; ii) a command or contacting information that enables the invitee to join the call; or iii) a time at which the relevant portion is expected to be presented during the call.

For example, when a set (or "deck") of presentation slides has been uploaded for a conference call, invitees to the call can scroll through the set and mark a slide for the purpose of receiving i) an alert during the call or ii) a response to comments marked on the slide. The marking made by the invitee can indicate when the invitee is to be alerted to join the call. The alert can be sent to the invitee via Short-Message Service, Instant Messaging, email, or another means. Alternatively, the annotations can result in the automatic launch of a teleconferencing application for the purpose of joining the endpoint of the invitee to the conference call that is already in progress.

In addition, the system of the illustrative embodiment is able to modify the calendars of an invitee or invitees, such that the time that the invitee is advised to join the call, or is joined to the call, is trimmed to the time that a topic of interest is expected to be discussed on the call. The expected time can be based on the meeting agenda, the electronic documents, and/or the number of comments already accumulated.

Similarly, the invitee can annotate slides or portions of an electronic document with comments that he or she would like to have addressed during the conference call. The annotations can be in text, voice, or audio/video format, depending on the format or formats that would be appropriate for the medium of the conference call in question. During the call, each response is summarized or recorded when the corresponding comment is presented to the participants, and then the response is sent to the invitee or invitees who posted the comment in the first place. In some embodiments, if several invitees have related questions, a threaded question-and-answer transcript is presented to all of those invitees who have such related questions.

By using the disclosed technique of supporting partial conference call attendance, contextual posting of questions, and alerting of other conference call events, an invitee is able to participate in a selected portion or portions of a conference call. Alternatively, if the invitee has a limited number of questions, the invitee is able to receive the responses without having to join the call at all.

The illustrative embodiment of the present invention comprises: receiving, at a data-processing system, i) an electronic document, wherein the electronic document comprises a plurality of portions, and ii) a first pointer from a telecommunications endpoint of a first user, wherein the first pointer references a position within one of the portions in the plurality; presenting at least a subset of the portions in the plurality during a conference call, to at least a telecommunications endpoint of a second user; and transmitting a message to the telecommunications endpoint of the first user, based on the presenting of the portion that comprises the position referenced by the first pointer.

BRIEF DESCRIPTION OF THE DRAWINGS

FIG. 7 depicts response set 700, which corresponds to comments contained in an electronic document related to slide set 600.

DETAILED DESCRIPTION

Figure 1:
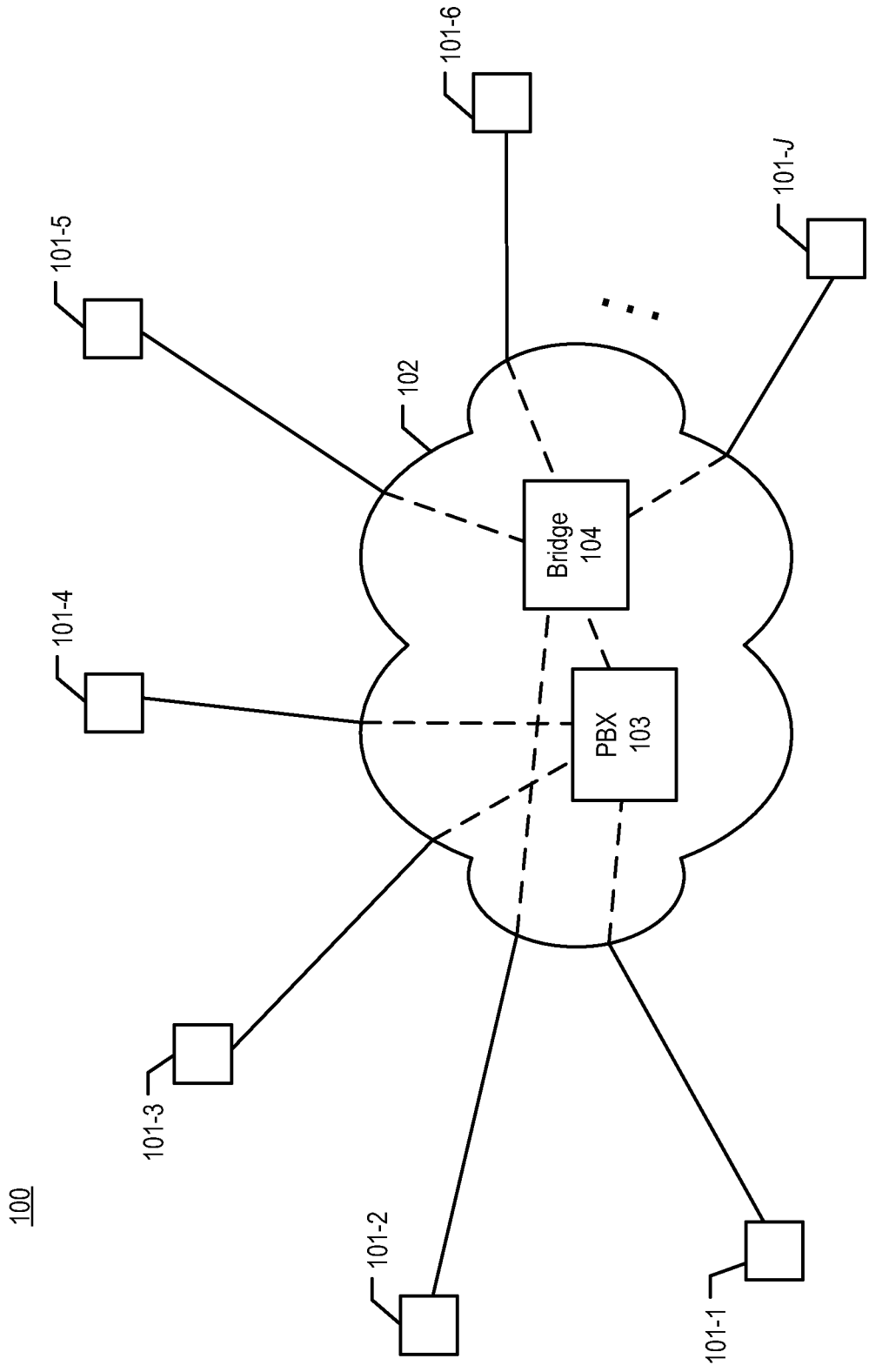
FIG. 1 depicts a schematic diagram of teleconference system 100 in accordance with the illustrative embodiment of the present invention.

FIG. 1 depicts a schematic diagram of teleconference system 100 in accordance with the illustrative embodiment of the present invention. System 100 comprises telecommunications endpoints 101-1 through 101-J, wherein J is an integer greater than one; telecommunications network 102; private branch exchange (PBX) 103; and teleconference bridge 104, interconnected as shown.

Telecommunications endpoint 101-j, where j has a value between 1 and J, inclusive, is a device that is capable of handling a telephone call for its user. Endpoint 101-j can be a cellular phone, a conference phone (i.e., "speakerphone"), a deskset, a computer with or without a resident softphone, or some other type of telecommunications appliance that is capable of exchanging voice signals. Endpoint 101-j is able to call, or to be called by, another endpoint or device within teleconference system 100. For example, in order to participate in a conference call, endpoint 101-j is able to dial a telephone number that routes to teleconference bridge 104.

Some of endpoints 101-1 through 101-J are endpoints that are tied to a private-branch exchange (PBX), such as desksets in an office enterprise network for which telecommunications service is enabled by private-branch exchange 103. For example, endpoints 101-1, 101-3, and 101-4 as depicted are PBX endpoints that route through PBX 103 in order to place or receive a call, such as a conference call that involves bridge 104. In any event, it will be clear to those skilled in the art how to make and use telecommunications endpoint 101-j.

Telecommunications network 102 provides the connectivity among endpoints 101-1 through 101-J, and enables the transport and control of communications signals between two or more endpoints per call. The communications signals convey bitstreams of encoded media, such as audio, video, and so forth. To this end, network 102 comprises one or more interconnected data-processing systems such as switches, servers, routers, and gateways, as are well-known in the art. For example, network 102 comprises private-branch exchange 103 and teleconference bridge 104.

In accordance with the illustrative embodiment, network 102 comprises an Internet Protocol-based (IP-based) network, as is known in art, for the purpose of transporting voice signals. Although network 102 in the illustrative embodiment comprises a Voice-over-IP (VoIP) service provider's network, network 102 could alternatively or additionally comprise another type of network such as the Internet, some other type of IP-based network, or some other type of packet-based network, such as the Public Switched Telephone Network, as those who are skilled in the art will appreciate.

Teleconference bridge 104 is a data-processing system, such as a server or switch, which enables the users of multiple endpoints to communicate with each other during a conference call, for one or more concurrent calls. Bridge 104 receives audio signals from endpoints that are participating on a conference call, mixes those signals together, and transmits the mixed signals back to the endpoints.

Bridge 104 also performs at least some of the tasks of the illustrative embodiment, which are described below and with respect to FIGS. 2 through 4. It will be clear, however, to those skilled in the art how to make and use alternative embodiments of the present invention in which a data-processing system different than bridge 104 performs the tasks of the illustrative embodiment. For example, in some alternative embodiments, private-branch exchange 103 might perform some or all of the tasks described herein or another data-processing system not shown might perform some or all of the tasks.

Furthermore, it will be clear to those skilled in the art, after reading this specification, how to make and use embodiments of system 100 in which the monitoring of a conference call is performed concurrently on behalf of one or more invitees of that call, for each of one or more calls being monitored.

Figure 2:
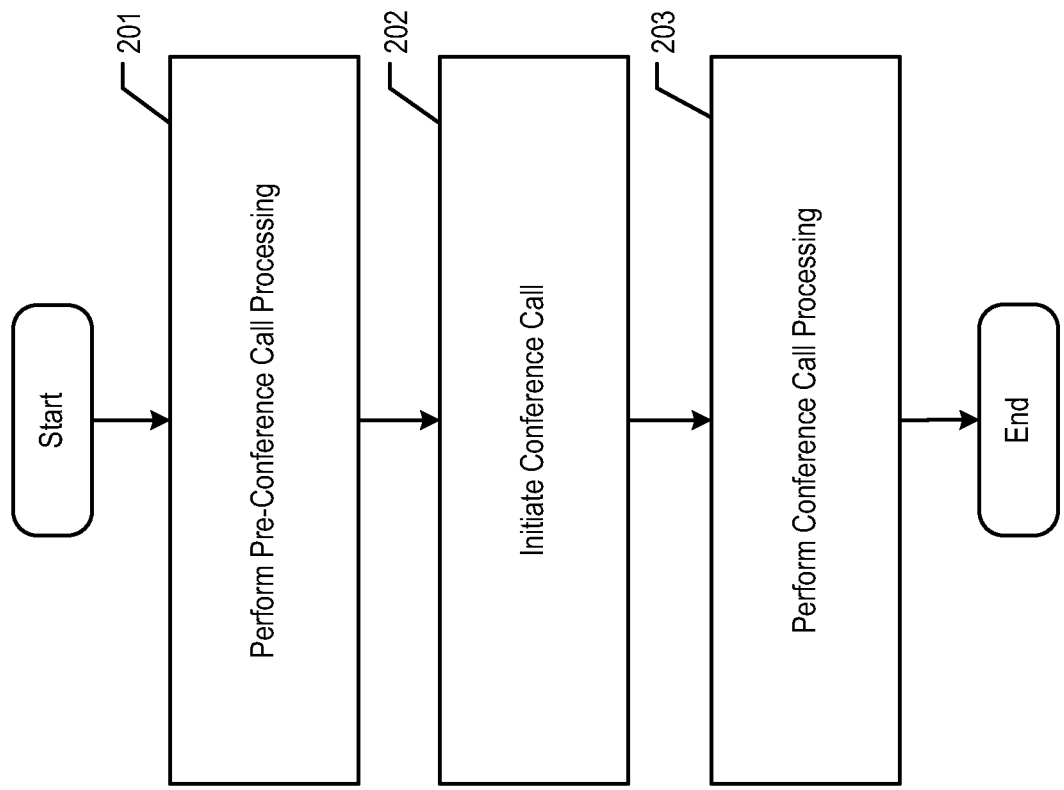
FIG. 2 depicts an overview of the conference call processing performed by teleconference bridge 104, in accordance with the illustrative embodiment of the present invention.
Figure 3:
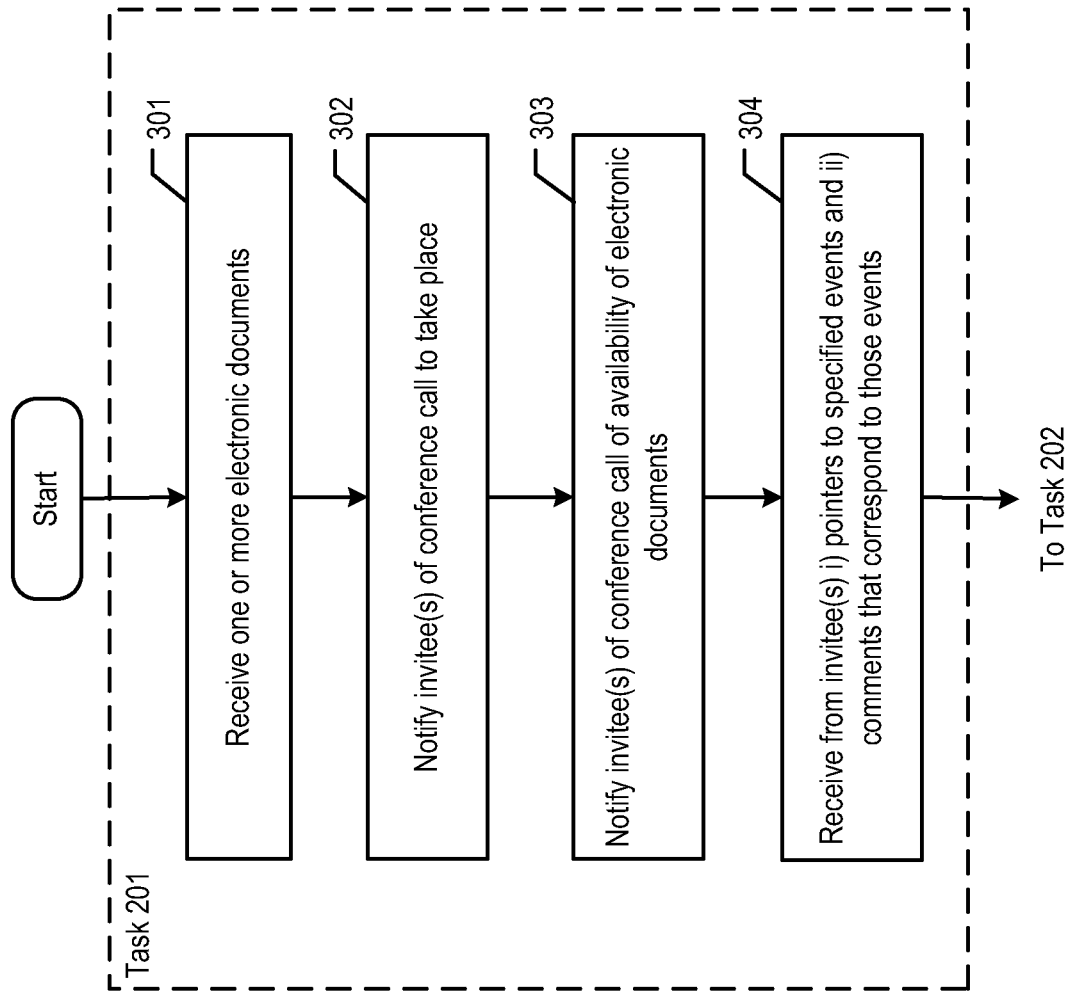
FIG. 3 depicts the tasks associated with performing the processing that occurs before the conference call begins.
Figure 4:
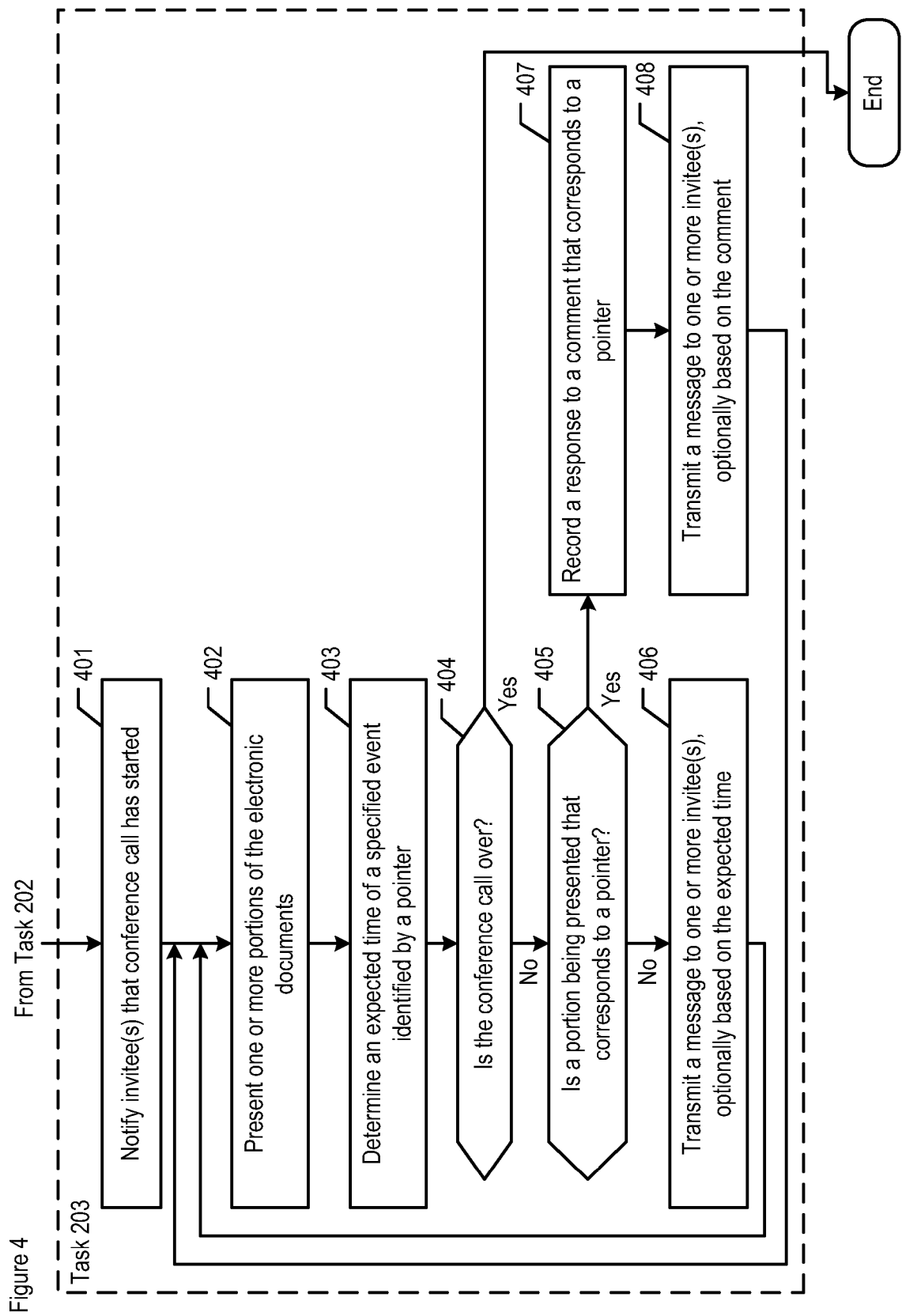
FIG. 4 depicts the tasks associated with performing the processing that occurs during the conference call.

FIGS. 2 through 4 depict flowcharts of salient tasks that are related to the performing of conference call processing, by teleconference bridge 104, in accordance with the illustrative embodiment of the present invention. As those who are skilled in the art will appreciate, some of the tasks that appear in the flowcharts can be performed in parallel or in a different order than that depicted. Moreover, those who are skilled in the art will further appreciate that in some alternative embodiments of the present invention, only a subset of the depicted tasks are performed.

FIG. 2 depicts an overview of the conference call processing performed by teleconference bridge 104.

At task 201, bridge 104 performs the processing that occurs before the conference call begins. The subtasks associated with task 201 are described below and with respect to FIG. 3.

At task 202, bridge 104 initiates the conference call in well-known fashion.

At task 203, bridge 104 performs the processing that occurs during the conference call. The subtasks associated with task 203 are described below and with respect to FIG. 4.

FIG. 3 depicts the tasks associated with performing the processing that occurs before the conference call begins.

At task 301, bridge 104 receives one or more electronic documents in objects such as computer files. In accordance with the illustrative embodiment, each electronic document comprises electronic media content. Examples of electronic documents include, but are not limited to:
 i. word processing documents, represented in computer files with extensions such as *.doc, *.txt, etc.;
 ii. spreadsheet documents, represented in computer files with extensions such as *.xls, etc.; and
 iii. graphics-software documents, represented in computer files with extensions such as *.ppt, *.vsd, etc.

The electronic documents are viewable or editable via compatible application software. Each electronic document can be provided from a different user, such as a person giving a presentation, or some or all of the documents can come from a centralized source. Each electronic document comprises a plurality of portions, such as the line items in conference agenda 500 or each slide in slide set 600, which are described with respect to FIGS. 5 and 6, respectively In some embodiments, each portion of a first electronic document might be associated with its own electronic document. For example, each agenda item listed in conference agenda 500 might have an associated electronic document such as a slide presentation. However, it will be clear to those skilled in the art, after reading this specification, how to make and use alternative embodiments in which each portion has more than one associated electronic document, or does not have any associated electronic document.

At task 302, bridge 104 notifies one or more of the conference call invitees of the call that is to take place. Alternatively, a participant of the call, such as the moderator or host, can notify the invitees.

At task 303, bridge 104 notifies one or more of the conference call invitees of the availability of electronic documents that are associated with the conference call. Alternatively, a participant of the call, such as the moderator or host, can notify the invitees. In some embodiments, the invitees are notified of where they can find the one or more electronic documents.

At task 304, bridge 104 receives information from one or more invitees related to the electronic documents made available at task 303. In particular, bridge 104 receives one or more pointers from each of one or more telecommunications endpoints, or other nodes. Each pointer references a position within one of the portions of an electronic document. In some embodiments, the position might identify a specified event related to the conference call, such as a particular topic on the list of agenda items or a particular part of a presentation. For example, a first invitee might have marked conference agenda 500 with pointer 501-1 that references a position within the conference agenda list, where the position corresponds to the phrase "Product Features," which is a specified event on the list of conference agenda items. In some embodiments the pointers are received separately, while in other embodiments a modified version of the electronic document that contains the pointers is received.

In accordance with the illustrative embodiment, bridge 104 is able to use each pointer for more than one purpose, such as i) providing advance notification to an invitee or ii) joining an invitee to a call. In some alternative embodiments, however, bridge 104 can allow an invitee to identify a particular portion of a document by using multiple pointers, and then bridge 104 uses each pointer for a different purpose. For example, in addition to there being a "main" pointer to identify a beginning position within a document, there can be an "advance" pointer which bridge 104 uses to determine when to notify the invitee, and there can be an "end" pointer to indicate the end position of a relevant portion in a document.

Bridge 104 is able to receive one or more comments from each of one or more endpoints, or other nodes. Each comment is associated with content within a portion of the electronic document. For example, a second invitee might have marked slide set 600 with pointer 602-1 and included comment 603-1, which is a question that the invitee would like answered by the person giving the presentation. In some embodiments the comments are received separately, while in other embodiments a modified version of the electronic document that contains the comments is received.

Although the illustrative embodiment features the pointers and/or comments being received prior to the conference call, it will be clear to those skilled in the art, after reading the specification, how to make and use alternative embodiments in which bridge 104 is able to receive pointers and/or comments during the call.

Task execution proceeds to task 202, at which the conference call is initiated. Depending on when bridge 104 receives information from each invitee, task 202 might be performed shortly thereafter (e.g., minutes, hours, etc.) or the task might be performed at a longer time thereafter (e.g., days, weeks, etc.).

FIG. 4 depicts the tasks associated with performing the processing that occurs during the conference call. During the time interval that corresponds to the execution of the depicted tasks, bridge 104 carries on the conference call with at least one endpoint of a participating user of teleconference system 100, aside from the one or more invitee users who are not present for at least part of the call. The conference call itself is made up of a plurality of specified events, such as events that are specified on a list of agenda items as shown in agenda 500.

At task 401, bridge 104 notifies the invitees that the conference call has started. In accordance with the illustrative embodiment, this is accomplished through one or more of various text-oriented means including, while not being limited to, Short-Message Service, Instant Messaging, email, and so forth. Alternatively, bridge 104 can notify the invitees via audio or video media.

In some embodiments, bridge 104 also presents the moderator or host of the call with an overview of all invitees who are not part of the call initially, along with the pointers that they have specified. During the call, this overview can be updated as some invitees join to become call "participants," and as some participants drop from the call and resume their status as non-participating "invitees."

At task 402, bridge 104 presents one or more portions of the electronic documents to the participants of the conference call, in well-known fashion. For example, based on having received commands from a presenter's endpoint, bridge 104 advances one or more times to a next, or specified, slide or page in the electronic document.

In some alternative embodiments, the portions of content that are presented during a call are not embodied in a collection of discrete documents, but are retrieved from any combination of one or more records, documents, messages, and/or other sources of content in an electronic storage system.

At task 403, bridge 104 determines an expected time of a specified event that has been identified by a pointer received at task 304. For example, on behalf of an invitee, the bridge might determine when a particular slide is expected to be presented. In some embodiments, the expected time can be based on i) the one or more scheduled times that are indicated by agenda 500, such as scheduled time 502-1, or ii) the time at which the expected time is determined, such as the current time in the conference call. Alternatively, the expected time can be based on some other aspect of agenda 500, the electronic documents, and/or the number of comments already accumulated.

In some alternative embodiments, the expected time can be determined at the scheduled time of the specified event. For example, referring to agenda 500, if the "Product Features" presentation is scheduled to start at 9:15 AM, as indicated by element 502-1, bridge 104 can determine the expected time at which the presentation is expected to begin, in the event that the overall conference call is running behind schedule.

At task 404, bridge 104 determines whether the conference call is over or not. If the call is not over, task execution proceeds to task 405. Otherwise, task execution ends.

At task 405, bridge 104 determines whether a portion that corresponds to a pointer received at task 304 is currently being presented. If not, task execution proceeds to task 406. Otherwise, task execution proceeds to task 407.

At task 406, bridge 104 transmits a message to the endpoints of one or more invitees. By transmitting the message, the bridge is alerting the invitee that the part of the conference call that is of interest to him is going to be discussed. In some embodiments, the transmitting of the message, or message itself, is based on the expected time determined at task 403 and/or the amount of advance notification the recipient invitee might have specified. In some other embodiments, the transmitting of the message is based on an advance notice position in the document having been reached, as identified by the "advance" pointer described with respect to task 304.

As those who are skilled in the art will appreciate, the transmitting of the message can serve various purposes. The message itself might comprise the expected time of when the discussion will take place. Instead of the expected time, the message might comprise an estimated difference in time between document positions that correspond to the "advance" and "main" pointers described above and with respect to task 304. The estimated difference in time can be determined, for example, either manually by the moderator or host, or automatically based on the rate of progress through the previous portions of the document. Alternatively, the message can comprise a command to join the endpoint of the invitee to the conference call at or around the expected time determined.

In some embodiments, the moderator or host of the call is able to control the transmission of a notification message to one or more invitees—for example, those invitees who have specified the same portion or similar portions of the electronic document. The moderator or host might track which portions of which documents an invitee is interested in, note the amount of advance notification that the invitee needs, and transmit the message accordingly.

After task 406, execution then proceeds back to task 402.

At task 407, bridge 104 optionally records a response to a comment provided at task 304, based at least on a portion being presented that is marked by a pointer received earlier from an invitee. For example, bridge 104 can record a response beginning at a slide that is being presented for which the invitee had left a comment.

At task 408, bridge 104 transmits a message to the endpoints of one or more invitees, based at least on a portion being presented that is marked by a pointer received earlier. In some embodiments, bridge 104 might transmit the message in order to alert the invitee that the current slide (or portion) is being presented, so that the invitee can join the part of the call that is of interest to him. Alternatively, the message might comprise a command to join the endpoint of the invitee to the conference call.

In some other embodiments, the transmitting of the message, or the message itself, can be based on the comment for which a response was provided at task 407. In this case, the bridge can notify the invitee that his comment has been responded to, possibly also providing a network location at which the response can be found. The message can comprise the response itself, so that the invitee can be provided with the response directly.

In any event, task execution then proceeds back to task 402.

As those who are skilled in the art will appreciate, the transmission of the message at task 406 or task 408 can be accomplished through one or more of various text-oriented means including, while not being limited to, Short-Message Service, Instant Messaging, email, and so forth. Alternatively, bridge 104 can transmit either type of message via audio or video media. Furthermore, either message can comprise a status of the conference call, while in some other embodiments either message can serve to modify the calendar of an invitee or invitees, such that the time that the invitee is advised to join the call, or is joined to the call, is trimmed to the time that a topic of interest is expected to be discussed on the call.

In some alternative embodiments, bridge 104 can notify an invitee that a portion of a document was skipped over on the call. For example, where there are multiple pointers specified for a given portion of the document, bridge 104 can transmit a first type of notification when the document positions corresponding to the "main" and "end" pointers—or the "advance", "main", and "end" pointers—are skipped over. Bridge 104 can transmit other types of notifications, depending on which combination of pointers (i.e., "advance", "main", "end") are either skipped or not skipped during the call.

Figure 5:
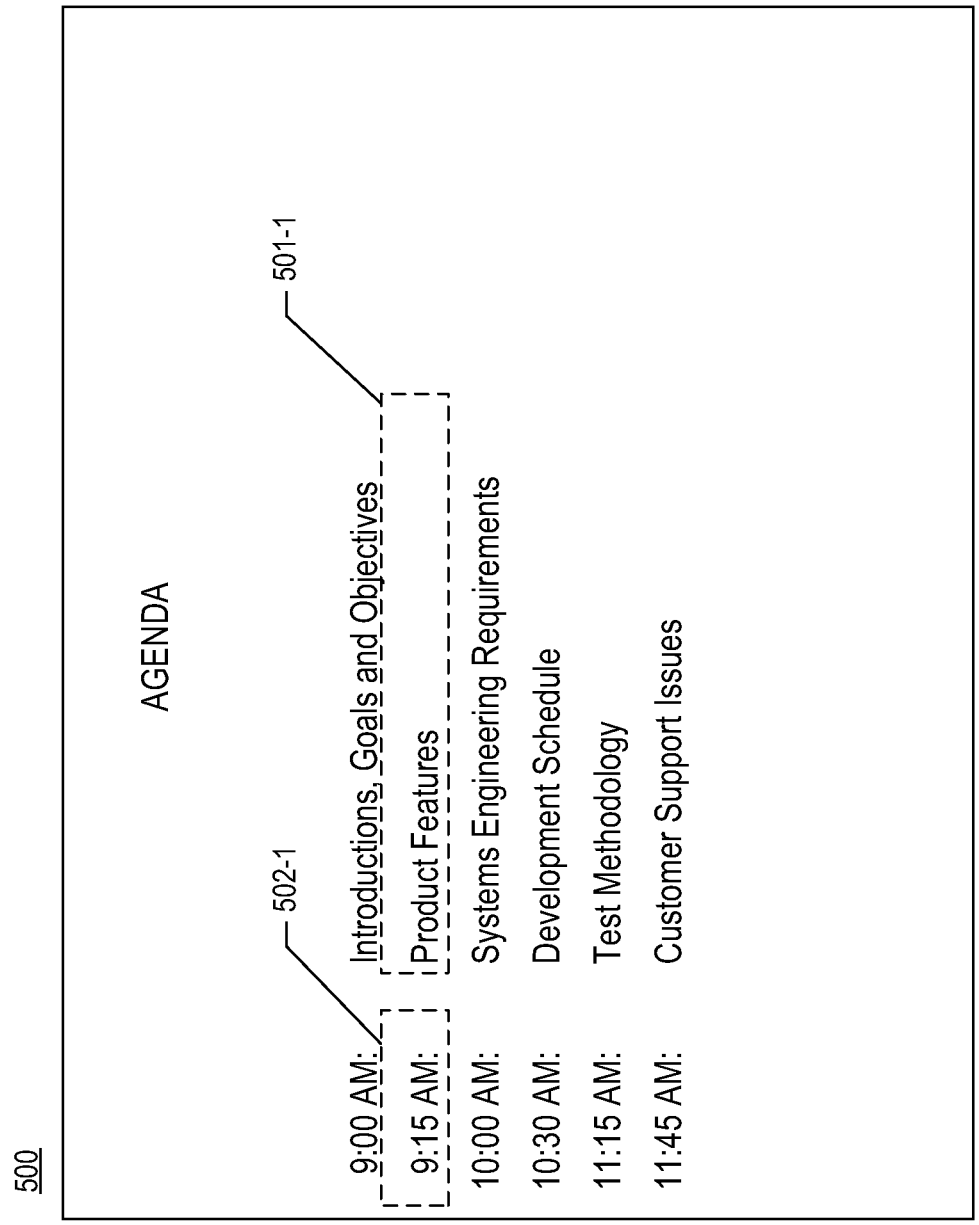
FIG. 5 depicts conference agenda 500, a first example of the content of an electronic document.

FIG. 5 depicts conference agenda 500, which comprises i) one or more pointers 501-1 through 501-P, and ii) one or more scheduled times 501-1 through 501-S, wherein P and S are positive integers. Although both P and S as depicted are equal to one, the value for each of P and S can be different from that depicted, as well as different from each other.

Although the teleconferencing system of the illustrative embodiment features an electronic document comprising a conference agenda (i.e., agenda 500), it will be clear to those skilled in the art, after reading this specification, how to make and use alternative embodiments in which a different number of agenda documents are used, or in which none at all are used.

Figure 6:
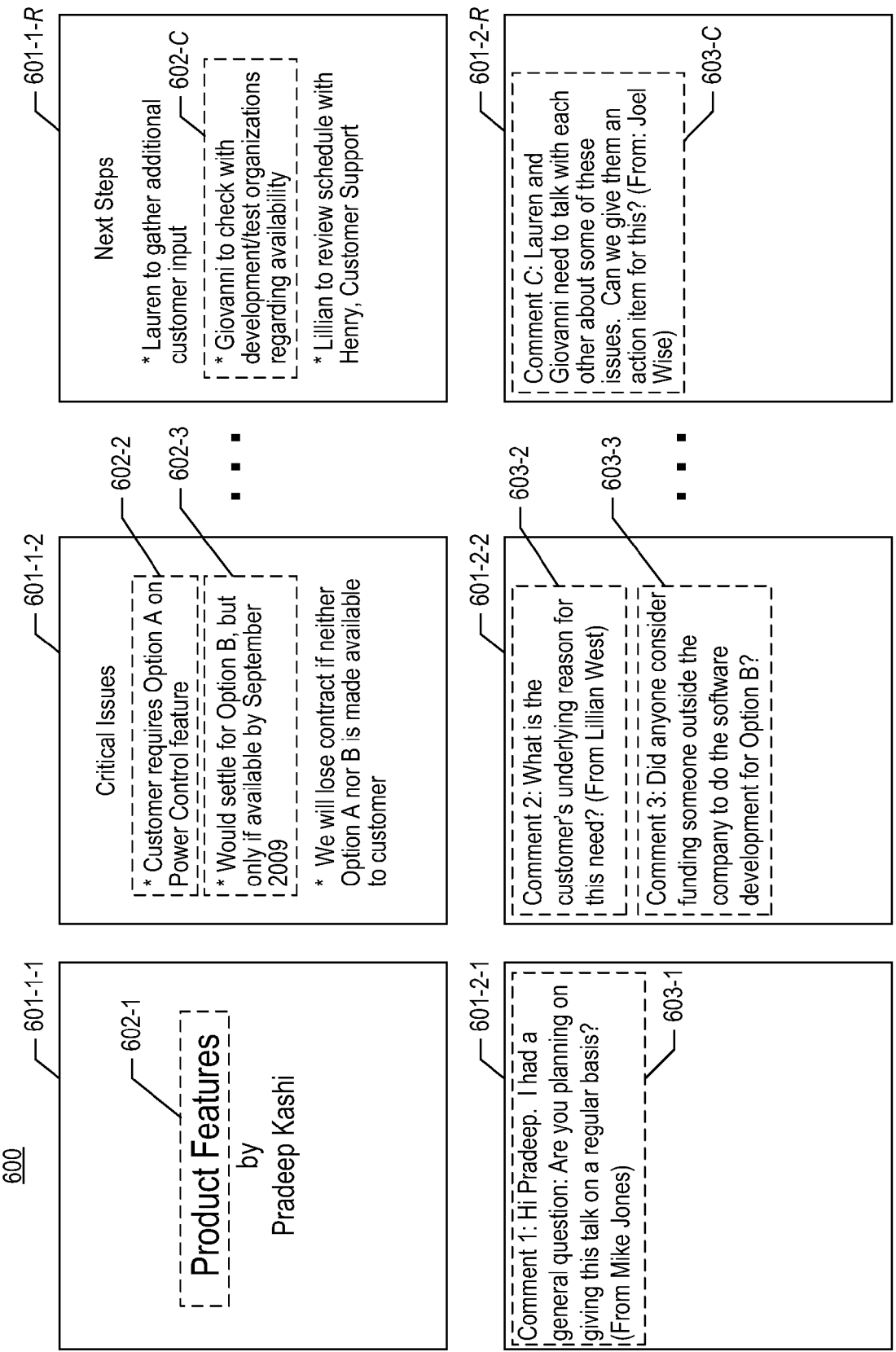
FIG. 6 depicts slide set 600, a second example of the content of an electronic document.

FIG. 6 depicts slide set 600, which comprises one or more presentation portions 601-1-1 through 601-1-R, wherein R is a positive integer. In accordance with the illustrative embodiment, a single portion corresponds to the content associated with one presentation slide. However, it will be clear to those skilled in the art, after reading this specification, how to make and use embodiments in which a single portion corresponds to the content associated with only part of one presentation slide, more than one presentation slide, or a different type of "page" than a slide, such as a page in a text file, a cell or worksheet in a spreadsheet, and so forth.

Although the teleconferencing system of the illustrative embodiment features an electronic document comprising a slide presentation (i.e., slide set 600), it will be clear to those skilled in the art, after reading this specification, how to make and use alternative embodiments in which a different number of presentation documents are used, or none at all are used.

Present as part of presentation portions 601-1-1 through 601-1-R are pointers 602-1 through 602-C, wherein C is a positive integer, as described above and with respect to task 304.

FIG. 6 further comprises one or more comment portions 601-2-1 through 601-2-R, which corresponds to the "scratchpad" area of slide set 600, or in a separate electronic document, which is used by the invitees to provide comments, as described with respect to task 304. Present as part of comment portions 601-2-1 through 601-2-R are comments 603-1 through 603-C, wherein C is a positive integer, as described above and with respect to task 304. In some embodiments, comments 603-1 through 603-C correspond to pointers 602-1 through 602-C.

FIG. 7 depicts response set 700, which comprises one or more response portions 601-3-1 through 601-3-R, wherein R is a positive integer. In accordance with the illustrative embodiment, each response portion corresponds to a presentation portion as described above and with respect to FIG. 6. Present as part of response portions 601-3-1 through 601-3-R are responses 701-1 through 701-C, wherein C is a positive integer, as described above and with respect to task 407. In some embodiments, responses 701-1 through 701-C correspond to comments 603-1 through 603-C.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, at a data-processing system, i) an electronic document, wherein the electronic document comprises a plurality of portions, and ii) a first pointer from a telecommunications endpoint of a first user, wherein the first pointer references by use of content information a position of a predetermined relevant content information within the plurality of portions, wherein the first pointer is specified by the first user;
   presenting at least a subset of the portions in the plurality during a conference call, to at least a telecommunications endpoint of a second user; and
   transmitting a message to the telecommunications endpoint of the first user, based on the presenting of the portion that comprises the position referenced by the first pointer.

2. The method of claim 1 wherein the electronic document comprises an agenda, and wherein the position corresponds to an event that is specified on the agenda.

3. The method of claim 1 wherein the electronic document comprises a slide presentation, and wherein the position corresponds to a slide within the slide presentation.

4. The method of claim 3 further comprising:
receiving a first comment from the telecommunications endpoint of the first user; and
associating the received first comment with content within the one of the portions of the electronic document that comprises the slide referenced by the first pointer.

5. The method of claim 4 further comprising recording a response to the first comment, wherein the message transmitted to the telecommunications endpoint of the first user is based on the response recorded.

6. The method of claim 5 wherein the message comprises at least a part of the response recorded.

7. The method of claim 5 wherein the recording of the response is based on the presenting of the one of the portions.

8. The method of claim 1 wherein the message comprises a command to join the telecommunications endpoint of the first user to the conference call.

9. The method of claim 1 wherein the message comprises a status of the conference call.

10. A method comprising:
receiving, at a data-processing system, i) an agenda that indicates one or more scheduled times at which a plurality of specified events are to take place during a conference call and ii) a first pointer from a telecommunications endpoint of a first user, wherein the first pointer references by use of content information a predetermined event within the agenda, wherein the first pointer is specified by the first user;
carrying on the conference call with at least a telecommunication endpoint of a second user, based on the plurality of specified events;
determining an expected time of a specified event identified by the first pointer; and
transmitting a message to the telecommunications endpoint of the first user based on the expected time determined.

11. The method of claim 10 wherein the expected time is based on i) the one or more scheduled times that are indicated by the agenda and ii) the time at which the expected time is determined.

12. The method of claim 11 wherein the message comprises a command to join the telecommunications endpoint of the first user to the conference call at the expected time determined.

13. The method of claim 11 wherein the message comprises the expected time.

14. The method of claim 10 wherein the expected time is determined at the scheduled time of the specified event.

15. A method comprising:
receiving, at a data-processing system, i) an electronic document, wherein the electronic document comprises a plurality of portions, ii) a first pointer from a telecommunications endpoint of a first user, wherein the first pointer references by use of content information a position of a predetermined relevant content information within the plurality of portions, wherein the first pointer is specified by the first user, and iii) a first comment from telecommunications endpoint of the first user;
associating the received first comment with content within the one of the portions of the electronic document that comprises the slide referenced by the first pointer;
presenting at least a subset of the portions in the plurality during a conference call, to at least a telecommunications endpoint of a second user;
recording a response to the first comment, based on the presenting of the one of the portions; and
transmitting a message to the telecommunications endpoint of the first user, based on the recording of the response.

16. The method of claim 15 wherein the message is based on the response recorded.

17. The method of claim 16 wherein the message comprises at least a part of the response recorded.

18. The method of claim 15 wherein the message comprises a command to join the telecommunications endpoint of the first user to the conference call.

19. The method of claim 15 wherein the message comprises a status of the conference call.

20. The method of claim 15 wherein the electronic document comprises a slide presentation, and wherein the position corresponds to a slide within the slide presentation.

* * * * *